United States Patent
Feng et al.

(10) Patent No.: US 9,991,829 B2
(45) Date of Patent: Jun. 5, 2018

(54) DIRECT-AXIS CURRENT PROTECTION METHOD AND DEVICE FOR PERMANENT MAGNET SYNCHRONOUS MOTOR DRIVE SYSTEM

(71) Applicant: CSR ZHUZHOU ELECTRIC LOCOMOTIVE RESEARCH INSTITUTE CO., LTD., Zhuzhou, Hunan (CN)

(72) Inventors: Jianghua Feng, Hunan (CN); Kean Liu, Hunan (CN); Junfeng Xu, Hunan (CN); Yaping He, Hunan (CN); Yuliang Wen, Hunan (CN); Jing Shang, Hunan (CN); Chaoyang Zhang, Hunan (CN); Xiong Liu, Hunan (CN)

(73) Assignee: CSR ZHUZHOU ELECTRIC LOCOMOTIVE RESEARCH INSTITUTE CO., LTD., Zhuzhou, Hunan (CN)

( * ) Notice: Subject to any disclaimer, the term of this patent is extended or adjusted under 35 U.S.C. 154(b) by 0 days. days.

(21) Appl. No.: 15/028,156

(22) PCT Filed: Dec. 16, 2013

(86) PCT No.: PCT/CN2013/089551
§ 371 (c)(1),
(2) Date: Apr. 8, 2016

(87) PCT Pub. No.: WO2015/054954
PCT Pub. Date: Apr. 23, 2015

(65) Prior Publication Data
US 2016/0268938 A1    Sep. 15, 2016

(30) Foreign Application Priority Data
Oct. 17, 2013    (CN) .......................... 2013 1 0487948

(51) Int. Cl.
*H02P 6/28* (2016.01)
*H02P 21/14* (2016.01)
(Continued)

(52) U.S. Cl.
CPC ............. *H02P 6/28* (2016.02); *H02H 7/0805* (2013.01); *H02P 21/14* (2013.01); *H02P 29/027* (2013.01)

(58) Field of Classification Search
CPC .......... H02P 6/28; H02P 21/14; H02H 7/0805
(Continued)

(56) References Cited

U.S. PATENT DOCUMENTS 6,009,003 A * 12/1999 Yeo .................. H02M 1/32
318/729
2007/0222409 A1* 9/2007 Kariatsumari .......... H02P 21/06
318/807
(Continued)

FOREIGN PATENT DOCUMENTS

| CN | 101505135 A | 8/2009 |
|----|-------------|--------|
| CN | 101982918 A | 3/2011 |

(Continued)

OTHER PUBLICATIONS

English translation of the Written Opinion of the International Searching Authority corresponding to Application No. PCT/CN2013/089551; dated Jun. 30, 2014.
(Continued)

*Primary Examiner* — Bentsu Ro
*Assistant Examiner* — Devon Joseph
(74) *Attorney, Agent, or Firm* — Cantor Colburn LLP

(57) ABSTRACT

A direct-axis current protection method and device for a permanent magnet synchronous motor drive system. The method includes: pre-calculating the direct-axis current of the next moment according to the current voltage transmit-
(Continued)

ted from an inverter to a permanent magnet synchronous motor (PMSM); comparing the direct-axis current of the next moment with a maximum protection current; if the direct-axis current of the next moment is less than the maximum protection current, continuing transmitting the current voltage to the PMSM; if the direct axis current of the next moment is greater than or equal to the maximum protection current, redistributing the voltage according to a protection direct-axis current and a protection quadrature-axis current, and transmitting the redistributed voltage to the PMSM. The direct-axis current of the next moment is tended to be normal by adjusting the voltage.

10 Claims, 6 Drawing Sheets

(51) Int. Cl.
  *H02P 29/024* (2016.01)
  *H02H 7/08* (2006.01)
(58) Field of Classification Search
  USPC ............................................. 318/400.2
  See application file for complete search history.

(56) References Cited

U.S. PATENT DOCUMENTS

| | | | | |
|---|---|---|---|---|
| 2007/0250233 | A1* | 10/2007 | Nagase | B62D 5/046 701/41 |
| 2008/0116842 | A1* | 5/2008 | Cheng | B60L 15/025 318/807 |
| 2009/0167224 | A1* | 7/2009 | Miura | B62D 5/046 318/400.23 |
| 2009/0212732 | A1* | 8/2009 | Royak | H02P 23/06 318/720 |
| 2009/0212734 | A1* | 8/2009 | Royak | H02P 21/0085 318/801 |
| 2010/0262307 | A1* | 10/2010 | Imura | H02P 21/14 700/287 |
| 2012/0170336 | A1* | 7/2012 | Chang | H02J 3/382 363/95 |
| 2012/0212162 | A1* | 8/2012 | Wu | H02P 21/14 318/400.02 |
| 2012/0212169 | A1* | 8/2012 | Wu | H02P 7/285 318/432 |
| 2012/0217908 | A1* | 8/2012 | Wu | H02P 21/04 318/400.02 |
| 2012/0217909 | A1* | 8/2012 | Wu | H02P 21/04 318/400.02 |
| 2014/0184133 | A1* | 7/2014 | Yuuki | H02K 1/2766 318/718 |
| 2014/0265951 | A1* | 9/2014 | Gebregergis | H02P 21/22 318/400.02 |
| 2014/0362622 | A1* | 12/2014 | Nademi | H02M 7/219 363/78 |

FOREIGN PATENT DOCUMENTS

| | | |
|---|---|---|
| CN | 102386836 A | 3/2012 |
| CN | 102710206 A | 10/2012 |
| CN | 102790575 A | 11/2012 |
| CN | 103107764 A | 5/2013 |
| JP | 2009290929 A | 12/2009 |

OTHER PUBLICATIONS

International Search Report corresponding to Application No. PCT/CN2013/089551; dated Jun. 30, 2014, with English translation.
Written Opinion of the International Searching Authority corresponding to Application No. PCT/CN2013/089551; dated Jun. 30, 2014.

* cited by examiner

DIRECT-AXIS CURRENT PROTECTION METHOD AND DEVICE FOR PERMANENT MAGNET SYNCHRONOUS MOTOR DRIVE SYSTEM

CROSS-REFERENCE

This application is the national phase of International Application No. PCT/CN2013/089551, titled "DIRECT-AXIS CURRENT PROTECTION METHOD AND DEVICE FOR PERMANENT MAGNET SYNCHRONOUS MOTOR DRIVE SYSTEM", and filed on Dec. 16, 2013, which claims priority to Chinese Patent Application No. 201310487948.X, titled "DIRECT-AXIS CURRENT PROTECTION METHOD AND DEVICE FOR PERMANENT MAGNET SYNCHRONOUS MOTOR DRIVE SYSTEM" and filed with the State Intellectual Property Office of People's Republic of China on Oct. 17, 2013, both of which are incorporated herein by reference in their entireties.

FIELD

The present application relates to the technical field of permanent magnet synchronous motor control, and particularly to a method for protecting a direct-axis current in a permanent magnet synchronous motor drive system and a device thereof.

BACKGROUND

A permanent magnet synchronous motor (PMSM) drive system is a new drive system that takes PMSM as a control object and controls the rotational speed and torque of the PMSM by means of frequency modulation and voltage modulation. Compared with a conventional alternating-current drive system taking an asynchronous motor as a control object, the PMSM drive system has advantages such as simple structure, high power density, large output torque at low speeds, high efficiency and convenient maintenance, and is overtaking an asynchronous motor alternating-current drive system as a future mainstream.

In a PMSM drive system, a direct-axis current of the PMSM directly affects distribution of current angles, a power factor of the PMSM during operation, reactive heat losses of the system, and weak magnetic properties of the PMSM at high speeds. More importantly, the permanent demagnetization of permanent magnetic materials for a rotor depends on the magnitude of the direct-axis current, and the permanent magnet will generate irreversible demagnetization in a case that the direct-axis current exceeds a demagnetization current of the permanent magnet. Thus, the protection for direct-axis current component of the PMSM is particularly important.

In conventional technology, from the perspective of design for the permanent magnet motor, permanent failure of the permanent magnet due to an excessive direct-axis current is protected through limiting a maximum operating point of the permanent magnet.

Referring to FIG. 1, a graph of a demagnetization segment of a B-H curve for the permanent magnet is shown.

FIG. 1 shows the demagnetization segment of the B-H curve for the permanent magnet. The permanent magnet operates under this segment in case of a motor in operating condition. The permanent magnet at no load operates at point A in case of a motor at no load, for an air gap causes demagnetization of the permanent magnet. An armature corresponding to the direct-axis current will generate further demagnetization effect in case of a motor at loads, i.e., the permanent magnet at maximum load operates at point B. The worst demagnetization effect occurs in case of a motor with short circuits, such as point C. The permanent magnet will generate reversible demagnetization if the point C is below the inflection point. Therefore, the operating point corresponding to the worst demagnetization caused by the short circuit of the permanent magnet motor is designed above the inflection point of the permanent magnet or same as the inflection point of magnetic field line of the permanent magnet, to avoid permanent magnetism-loss of the permanent magnet due to large demagnetization effect of the armature corresponding to the direct-axis.

From the perspective of motor control strategy, there is no article that describes the protection for the direct-axis current nowadays in the world. Only in documents that describe a vector control strategy, a currently given value is limited to meet the need of control, and the main implementation is to obtain a quadrature-axis current $i_{q\_ref}$ through a proportional integral (PI) regulator for torque or rotational speed and obtain a given direct-axis current $i_{d\_ref}$ through the maximum torque-current ratio, with a restriction: $|i_{d\_ref}| < i_{d\_MAX}$.

From the perspective of motor design, the operating point of the permanent magnet with maximum direct-axis operating current is designed to be same as the inflection point or above the inflection point, to avoid permanent failure of the permanent magnet of the rotor due to a large direct-axis current component. However, the direct-axis current of the motor during actual operation is unknown, permanent failure of the permanent magnet will be caused if the actual direct-axis current is too large due to a system crash.

From the perspective of control, a given direct-axis current component is limited during the control only for preventing the given current exceeding a range of safe operation of the motor, without protection for the actual direct-axis current of motor and for the current of next moment generated by the motor based on a voltage at the present moment. Magnetism-loss of the permanent magnet motor will still be caused if the current of the motor is out of control.

In conventional technology, in the PMSM drive system, only a currently given direct-axis current is limited for protection, but the direct-axis current of next moment caused by the voltage at the present moment is not pre-calculated. If the direct-axis current of next moment is high, a too large reactive component, low power factor and large loss of the PMSM drive system will be caused, which leads to a catastrophic failure of the system.

SUMMARY

The technical issue to be solved in the disclosure is to provide a method for protecting a direct-axis current in a permanent magnet synchronous motor drive system and a device thereof, in which a direct-axis current at a next moment may be pre-calculated accurately, and is protected based on a pre-calculated direct-axis current.

A method for protecting a direct-axis current in a permanent magnet synchronous motor drive system is provided. The method includes:

pre-calculating a direct-axis current $i_d(K+1)$ at a next moment based on a voltage at a present moment sent to a permanent magnet synchronous motor PMSM from an inverter, wherein K represents a present moment, and K+1 represents a next moment;

comparing the direct-axis current at the next moment with a maximum protective current $i_{d\_protect}$, wherein the maximum protective current $i_{d\_protect}$ has a predetermined value;

sending the voltage at the present moment to the PMSM unceasingly, if the direct-axis current $i_d(K+1)$ at the next moment is less than the maximum protective current $i_{d\_protect}$; and re-distributing a voltage based on a protective direct-axis current and a protective quadrature-axis current, and sending the re-distributed voltage to the PMSM, if the direct-axis current $i_d(K+1)$ at the next moment is greater than or equal to the maximum protective current $i_{d\_protect}$.

Preferably, the direct-axis current $i_d(K+1)$ at the next moment is pre-calculated based on the voltage at the present moment sent to the permanent magnet synchronous motor PMSM, $$i_d(K+1) = \frac{u_d(K)(R_s + L_q s) + (u_q(K) - \omega_e \psi_f)\omega_e L_q}{(R_s + L_q s)(R_s + L_d s) + \omega_e^2 L_d L_q},$$

where $u_d(K)$ and $u_q(K)$ are components of a stator voltage on d axis and q axis respectively; $L_d$, $L_q$ are a direct-axis synchronous inductance and a quadrature-axis synchronous inductance respectively; $\omega_e$ is an electrical angular velocity of a motor and $\omega_e = n_p \omega_r$; $n_p$ is an amount of pole pairs of the motor, $\omega_r$ is a mechanical angular velocity of the motor; $\psi_f$ is magnetic linkage of a permanent magnet, $R_s$ is a stator resistance, and s is a laplacian operator.

Preferably, re-distributing the voltage based on the protective direct-axis current and the protective quadrature-axis current includes:

using the maximum protective current $i_{d\_protect}$ as a protective direct-axis current $i'_d(K+1)$ of the PMSM;

calculating the protective quadrature-axis current based on the protective direct-axis current; and calculating the re-distributed voltage based on the protective direct-axis current and the protective quadrature-axis current.

Preferably, calculating the protective quadrature-axis current $i'_q(K+1)$ based on the protective direct-axis current comprises:

$$i'_q(K+1) = \frac{2T_e(K+1)}{3p(\psi_f + (L_d - L_q)i_{d\_protect})},$$

where $T_e(K+1) = \frac{3}{2} p i_q(K+1)(\psi_f + (L_d - L_q)i_d(K+1))$, and $i_q(K+1) = \frac{u_q(K)(R_s + L_d s) - (u_d(K)L_d + \psi_f(R_s + L_d s))\omega_e}{(R_s + L_q s)(R_s + L_d s) + \omega_e^2 L_d L_q}$.

Calculating the re-distributed voltage based on the protective direct-axis current and the protective quadrature-axis current includes:

$u'_d(K) = R_s i'_d(K+1) - \omega_e L_q i'_q(K+1)$, and $u'_q(K) = R_s i'_q(K+1) + \omega_e(L_d i'_d(K+1) + \psi_f)$, where the re-distributed voltage comprises a re-distributed direct-axis voltage $u'_d(K)$ and a re-distributed quadrature-axis voltage $u'_q(K)$, $T_e(K+1)$ is torque of the PMSM, $u_d(K)$ and $u_q(K)$ are components of a stator voltage on d axis and q axis respectively; $L_d$ and $L_q$ are a direct-axis synchronous inductance and a quadrature-axis synchronous inductance respectively; $\omega_e$ is an electrical angular velocity of a motor and $\omega_e = n_p \omega_r$; $n_p$ is an amount of pole pairs of the motor, $\omega_r$ is a mechanical angular velocity of the motor; $\psi_f$ is magnetic linkage of a permanent magnet, $R_s$ is a stator resistance, and s is a laplacian operator.

Preferably, if the direct-axis current $i_d(K+1)$ at the next moment is greater than or equal to the maximum protective current $i_{d\_protect}$, the method further includes: introducing the direct-axis current into a PI regulator for the direct-axis current, $$u_{d\_pi\_Out} = \left(K_p + K_i \frac{1}{s}\right)(i_{d\_ref} - i_{d\_back}) + K_c \Delta i_d$$

$$\Delta i_d = i_{d\_protect} - i_d(K+1);$$

where $u_{d\_pi\_Out}$ is an output voltage of the PI regulator for the direct-axis current; and $K_i$ is an integral regulation coefficient; $K_p$ is a proportional control factor; $i_{d\_ref}$ is a given value of the direct-axis current; $i_{d\_back}$ is a feedback value of the direct-axis current; and $K_c$ is a compensation coefficient of the direct-axis current.

A device for protecting a direct-axis current in a permanent magnet synchronous motor drive system is provided. The device includes a pre-calculating unit for a direct-axis current at a next moment, a direct-axis current comparing unit, a voltage sending unit and a voltage re-distributing unit;

the pre-calculating unit for the direct-axis current at the next moment is configured to pre-calculate a direct-axis current $i_d(K+1)$ at a next moment based on a voltage at a present moment sent to a permanent magnet synchronous motor PMSM, wherein K represents a present moment, and K+1 represents a next moment;

the direct-axis current comparing unit is configured to compare the direct-axis current at the next moment with a maximum protective current $i_{d\_protect}$, wherein the maximum protective current $i_{d\_protect}$ has a predetermined value;

the voltage sending unit is configured to send the voltage at the present moment to the PMSM unceasingly when the direct-axis current comparing unit determines that the direct-axis current $i_d(K+1)$ at the next moment is less than the maximum protective current $i_{d\_protect}$; and the voltage re-distributing unit is configured to re-distribute a voltage based on a protective direct-axis current and a protective quadrature-axis current, and send a re-distributed voltage to the PMSM, when the direct-axis current comparing unit determines that the direct-axis current $i_d(K+1)$ at the next moment is greater than or equal to the maximum protective current $i_{d\_protect}$.

Preferably, pre-calculating, by the pre-calculating unit for the direct-axis current at the next moment, the direct-axis current $i_d(K+1)$ at the next moment based on the voltage at the present moment sent to the permanent magnet synchronous motor PMSM, is implemented through the following equation:

$$i_d(K+1) = \frac{u_d(K)(R_s + L_q s) + (u_q(K) - \omega_e \psi_f)\omega_e L_q}{(R_s + L_q s)(R_s + L_d s) + \omega_e^2 L_d L_q},$$

where $u_d(K)$ and $u_q(K)$ are components of a stator voltage on d axis and q axis respectively; $L_d$, $L_q$ are a direct-axis synchronous inductance and a quadrature-axis synchronous inductance respectively; $\omega_e$ is an electrical angular velocity of a motor and $\omega_e = n_p \omega_r$; $n_p$ is an amount of pole pairs of the motor, $\omega_r$ is a mechanical angular velocity of the motor, $\omega_f$ is magnetic linkage of a permanent magnet, $R_s$ is a stator resistance, and s is a laplacian operator.

Preferably, the voltage re-distributing unit includes a protective direct-axis current determining sub-unit, a protective quadrature-axis current determining sub-unit and a re-distributed voltage determining sub-unit;

the protective direct-axis current determining sub-unit is configured to use the maximum protective current $i_{d\_protect}$ as a protective direct-axis current $i'_d(K+1)$ of the PMSM;

the protective quadrature-axis current determining sub-unit is configured to calculate the protective quadrature-axis current based on the protective direct-axis current; and the re-distributed voltage determining sub-unit is configured to calculate the re-distributed voltage based on the protective direct-axis current and the protective quadrature-axis current.

Preferably, the protective quadrature-axis current determining sub-unit calculates the protective quadrature-axis current based on the protective direct-axis current through the following equation:

$$i'_q(K+1) = \frac{2T_e(K+1)}{3p(\psi_f + (L_d - L_q)i_{d\_protect})},$$

where $T_e(K+1) = \frac{3}{2}pi_q(K+1)(\psi_f + (L_d - L_q)i_d(K+1))$ and $i_q(K+1) = \frac{u_q(K)(R_s + L_d s) - (u_d(K)L_d + \psi_f(R_s + L_d s))\omega_e}{(R_s + L_q s)(R_s + L_d s) + \omega_e^2 L_d L_q}$;

and calculating, by the re-distributed voltage determining sub-unit, the re-distributed voltage through the following equation, includes:

$u'_d(K) = R_s i'_d(K+1) - \omega_e L_q i'_q(K+1)$, and $u'_q(K) = R_s i'_q(K+1) + \omega_e(L_d i'_d(K+1) + \psi_f)$, where the re-distributed voltage comprises a re-distributed direct-axis voltage $u'_d(K)$ and a re-distributed quadrature-axis voltage $u'_q(K)$, $T_e(K+1)$ is torque of the PMSM, $u_d(K)$ and $u_q(K)$ are components of a stator voltage on d axis and q axis respectively; $L_d$ and $L_q$ are a direct-axis synchronous inductance and a quadrature-axis synchronous inductance respectively; $\omega_e$ is an electrical angular velocity of a motor and $\omega_e = n_p \omega_r$; $n_p$ is an amount of pole pairs of the motor, $\omega_r$ is a mechanical angular velocity of the motor, $\psi_f$ is magnetic linkage of a permanent magnet, $R_s$ is a stator resistance, and s is a laplacian operator.

Preferably, the device further includes a correcting unit for PI regulation of the direct-axis current;

where the correcting unit for PI regulation of the direct-axis current is configured to introduce the direct-axis current into a PI regulator for the direct-axis current when the direct-axis current comparing unit determines that the direct-axis current $i_d(K+1)$ at the next moment is greater than or equal to the maximum protective current $i_{d\_protect}$, and a equation for a corrected PI regulator for the direct-axis current is as follows:

$$u_{d\_pi\_Out} = \left(K_p + K_i \frac{1}{s}\right)(i_{d\_ref} - i_{d\_back}) + K_c \Delta i_d,$$

where $u_{d\_pi\_Out}$ is an output voltage of the PI regulator for the direct-axis current; and $K_i$ is an integral regulation coefficient; $K_p$ is a proportional control factor; $i_{d\_ref}$ is a given value of the direct-axis current; $i_{d\_back}$ is a feedback value of the direct-axis current; and $K_c$ is a compensation coefficient of the direct-axis current.

Compared with the conventional technology, the following advantages exists in the disclosure:

in the method for protecting the direct-axis current in the permanent magnet synchronous motor drive system according to this embodiments of the disclosure, the direct-axis current of the PMSM at the next moment may be pre-calculated based on the voltage of the PMSM at the present moment through the steady state mathematical model of the PMSM. If the direct-axis current at the next moment does not exceed the limit, the protection is not performed, and the voltage at the present moment is sent to the PMSM unceasingly, and if the direct-axis current at the next moment exceeds the limit, i.e., the direct-axis current at the next moment is greater than the maximum protective current, the protection is performed, and a recalculated voltage is re-distributed to the PMSM. In this way, the direct-axis current at the next moment normalizes through regulating the voltage, and the re-distributed voltage is sent to the PMSM under a constant operating load of the PMSM. Thus, in the method provided in the disclosure, the direct-axis current at the next moment is pre-calculated, actual operation of the PMSM is simulated, and the protection is performed when the direct-axis current at the next moment exceeds the limit.

BRIEF DESCRIPTION OF THE DRAWINGS

In order to illustrate technical solutions in the embodiments of the disclosure or the conventional technology more clearly, the drawings to be used in the description of the embodiments or the conventional technology are described briefly hereinafter. Apparently, the drawings described hereinafter are only some embodiments of the disclosure. For those skilled in the art, other drawings may be obtained based on these drawings without any creative effort.

DETAILED DESCRIPTION

Figure 1:
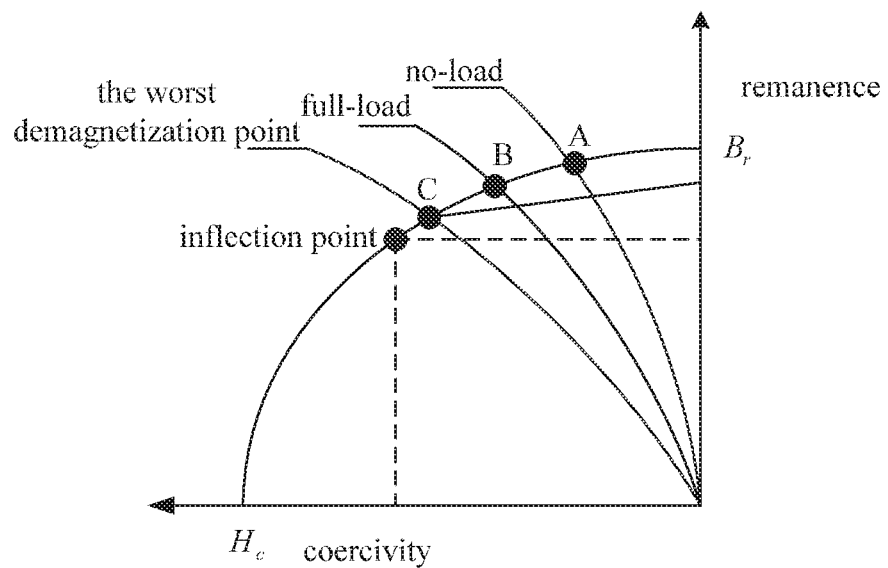
FIG. 1 is a graph of a demagnetization segment of a B-H curve for a permanent magnet.

In order that those skilled in the art better understand and implement the technical solutions of the disclosure, some basic operational principles of a permanent magnet synchronous motor PMSM are described hereinafter.

Firstly, a steady state mathematical model of the PMSM is described.

In order to simplify the analysis and reduce dimensions of equations, a mathematical model of the permanent magnet synchronous motor in a dq synchronously rotating coordinate system is used. Voltage equations and magnetic linkage equations for the permanent magnet synchronous motor in the dq synchronously rotating coordinate system may be expressed as equations (1) and (2) respectively:

$$\left.\begin{array}{l} u_d = i_d \cdot R - \omega_e \cdot L_q \cdot i_q \\ u_q = i_q \cdot R + \omega_e \cdot L_d \cdot i_d + \omega_e \cdot \psi_f \end{array}\right\} \quad (1)$$

$$\left.\begin{array}{l} \psi_d = \psi_f + L_d \cdot i_d \\ \psi_q = L_q \cdot i_q \\ \psi_s = \sqrt{(\psi_f + L_d \cdot i_d)^2 + (L_q \cdot i_q)^2} \end{array}\right\} \quad (2)$$

where $i_d$, $i_q$, $u_d$, $u_q$, $\psi_d$ and $\psi_q$ are components of a stator current, voltage and magnetic linkage on d axis and q axis respectively; $L_d$, $L_q$ are direct-axis synchronous inductance and quadrature-axis synchronous inductance respectively; $\omega_e$ is an electrical angular velocity of the motor and $\omega_e = n_p \omega_r$ ($n_p$ is an amount of pole pairs of the motor, $\omega_r$ is a mechanical angular velocity of the motor); p is a differential operator, and $$p = \frac{d}{dt}.$$

In a steady state, the voltage equation (1) may be simplified into equations (3) and (4):

$$u_d = R_s i_d - \omega_e L_q i_q \quad (3)$$

$$u_q = R_s i_q + \omega_e L_d i_d + \omega_e \psi_f \quad (4)$$

Effects of a direct-axis current of the PMSM on the permanent magnet drive system are analyzed hereinafter.

1. The Direct-Axis Current Affects a Power Factor of the Permanent Magnet Motor

Figure 2:
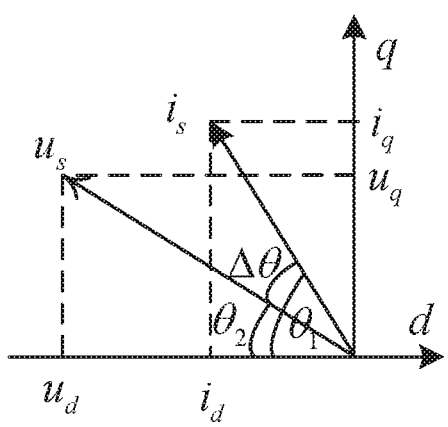
FIG. 2 is a graph of voltage and current distribution of a permanent magnet synchronous motor.

Referring to FIG. 2, a graph of voltage and current distribution of a permanent magnet synchronous motor is shown.

It is defined that a counterclockwise rotation is a positive direction for the PMSM, and, a angle of the power factor under an operating condition of the motor is $\Delta\theta$:

$$\Delta\theta = a\sin\left(\frac{L_q i_q^2 - |i_d|(L_d i_d + \psi_f)}{\sqrt{i_d^2 + i_q^2}\sqrt{(L_q i_q)^2 + (L_d i_d + \psi_f)^2}}\right) \quad (5)$$

and a relationship between a quadrature-axis current and the direct-axis current is:

$$i_q = 2T_e/3P_n((L_d - L_q)i_d + \psi_f) \quad (6)$$

Therefore, under a constant load, the distribution of the direct-axis current directly affects the angle $\Delta\theta$ of the power factor of the PMSM.

2. The Direct-Axis Current Affects a Weak Magnetic Property of a High-Speed PMSM When a voltage capacity of the system is limited, the PMSM has to perform weak magnetic speed-up, and the voltage equation is:

$$u_s = \omega_e \sqrt{(L_q i_q)^2 + (L_d i_d + \psi_f)^2} \leq u_{max} \quad (7)$$

If the velocity is improved unceasingly, $(L_q i_q)^2 + (L_d i_d + \psi_f)^2$ must be decreased, and the relationship between the quadrature-axis current and the direct-axis current is as shown in equation (6), thus, the weak magnetic speed-up may be achieved through controlling and regulating the direct-axis current.

3. The Direct-Axis Current Affects a Rotor Permanent Magnet

Based on properties of permanent magnetic materials, the permanent magnet will generate irreversible demagnetization in a case that it operates below a inflection point. Meanwhile, it may be learned from the magnetic linkage equation that, an armature reaction of the direct axis causes a demagnetization effect. A value of the current of the permanent magnet motor is maximum in case of a motor with short circuits, and on this occasion, the voltage of the permanent magnet motor is zero, and the voltage equation is as follows (neglecting effects of resistances):

$$0 = -\omega_e L_q i_q \quad (8)$$

$$0 = \omega_e L_d i_d + \omega_e \psi_f \quad (9)$$

The short circuit current at this moment is basically the direct-axis current: $I_s = i_d = \psi_f / L_d$, thus, the direct-axis current is maximum, and a maximum permanent magnet demagnetization is generated. Irreversible demagnetization will be caused to the permanent magnet if the operating point of the permanent magnet is below the inflection point in this case.

Hereinafter technical solutions in the embodiments of the disclosure are described clearly and completely in conjunction with drawings of the embodiments of the disclosure. Apparently, the described embodiments are only some of the embodiments of the disclosure rather than all the embodiments. Any other embodiment obtained by those skilled in the art based on the embodiments of the disclosure without any creative work falls within the protection scope of the disclosure.

To make objectives, features and advantages of the disclosure mentioned above more obvious, specific embodiments of the disclosure will be described in detail hereinafter in conjunction with drawings.

A First Method Embodiment

Figure 3:
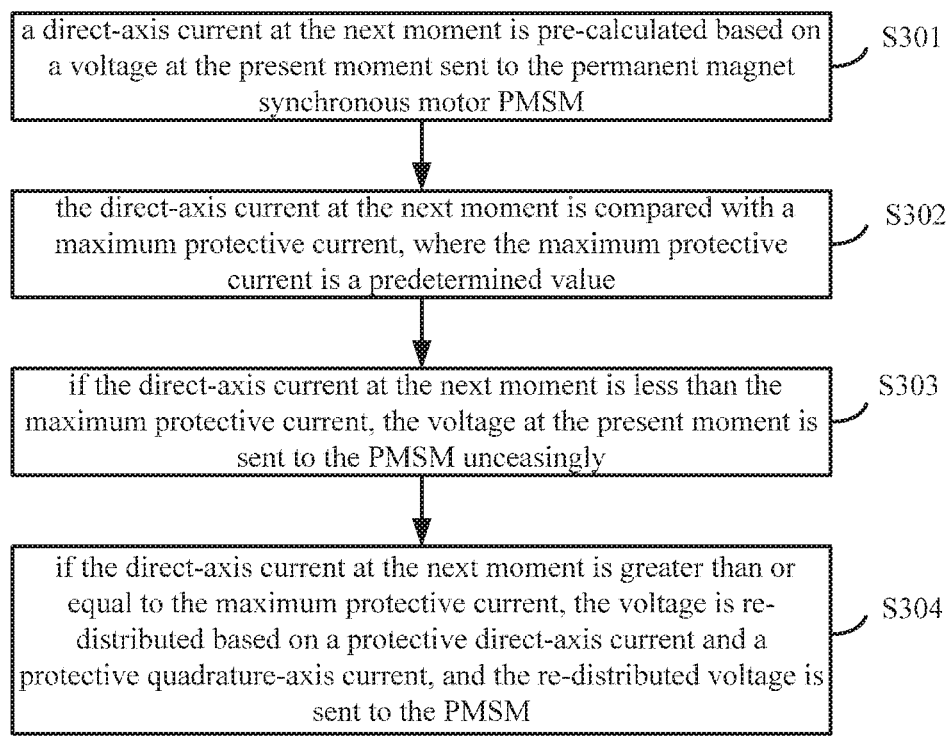
FIG. 3 is a flow chart of a method for protecting a direct-axis current in a permanent magnet synchronous motor drive system according to a first method embodiment of the disclosure.

Referring to FIG. 3, a flow chart of a method for protecting a direct-axis current in a permanent magnet synchronous motor drive system according to a first embodiment of the disclosure is shown.

It is understandable that, if a hardware-acquired signal is lost (current information and location information jumps) or an external operating condition is out of control, the voltage outputted from an inverter to the motor is caused to be large, and uncontrollable direct-axis current information is generated by the motor. If the direct-axis current exceeds a maximum protection value, a system overcurrent failure or even a magnetism-loss of the permanent magnet is directly caused. Thus, in this embodiment of the disclosure, not only a given value of the direct-axis current at a present moment is limited, but an actual direct-axis current at a next moment generated by the PMSM is pre-calculated and protected.

The method for protecting the direct-axis current in the permanent magnet synchronous motor drive system according to this embodiment includes steps S301-S304.

In step S301, a direct-axis current $i_d(K+1)$ at the next moment is pre-calculated based on a voltage at the present moment sent to the permanent magnet synchronous motor PMSM, where K represents the present moment, and K+1 represents the next moment.

It should be noted that, the direct-axis current and a quadrature-axis current at the next moment may be calculated based on a direct-axis voltage and a quadrature-axis voltage of the PMSM at the present moment.

The direct-axis voltage and the quadrature-axis voltage are known, and are outputted from the inverter to the PMSM.

Based on a steady state mathematical model of the PMSM, the direct-axis current at the next moment is pre-calculated, the voltage $(u_d(k), u_q(k))$ at the present moment is sent to the PMSM, and the PMSM will generate a actual direct-axis current which is a direct-axis current $i_d(k+1)$ at the next moment relative to a sampling current with closed-loop control.

In step S302, the direct-axis current at the next moment is compared with a maximum protective current $i_{d\_protect}$, where the maximum protective current $i_{d\_protect}$ has a predetermined value.

In step S303, if the direct-axis current $i_d(K+1)$ at the next moment is less than the maximum protective current $i_{d\_protect}$, the voltage at the present moment is sent to the PMSM unceasingly; and if the direct-axis current at the next moment is less than the maximum protective current, it concludes that the direct-axis current does not exceed a limit, and the voltage $(u_d(k), u_q(k))$ at the present moment may be sent to the PMSM unceasingly.

In step S304, if the direct-axis current $i_d(K+1)$ at the next moment is greater than or equal to the maximum protective current $i_{d\_protect}$, the voltage is re-distributed based on a protective direct-axis current and a protective quadrature-axis current, and the re-distributed voltage is sent to the PMSM.

If the direct-axis current at the next moment is greater than the maximum protective current, and the voltage at the present moment $(u_d(k), u_q(k))$ is sent to the PMSM unceasingly, a too high direct-axis current will be generated by the PMSM actually, and the permanent magnet faces a risk of magnetism-loss, or even a catastrophic failure of system subversion. Thus, the voltage has to be re-distributed to the PMSM.

In the method for protecting the direct-axis current in the permanent magnet synchronous motor drive system according to this embodiment of the disclosure, the direct-axis current of the PMSM at the next moment may be pre-calculated based on the voltage of the PMSM at the present moment through the steady state mathematical model of the PMSM. If the direct-axis current at the next moment does not exceed the limit, the protection is not performed, and the voltage at the present moment is sent to the PMSM unceasingly, and if the direct-axis current at the next moment exceeds the limit, i.e., the direct-axis current at the next moment is greater than the maximum protective current, the protection is performed, and a recalculated voltage is re-distributed to the PMSM. In this way, the direct-axis current at the next moment normalizes through regulating the voltage, and the re-distributed voltage is sent to the PMSM under a constant operating load of the PMSM. Thus, in the method provided in the disclosure, the direct-axis current at the next moment is pre-calculated, actual operation of the PMSM is simulated, and the protection is performed when the direct-axis current at the next moment exceeds the limit.

A Second Method Embodiment

Hereinafter the implementation of the method provided in the disclosure is described in detail in conjunction with the embodiment.

Figure 4:
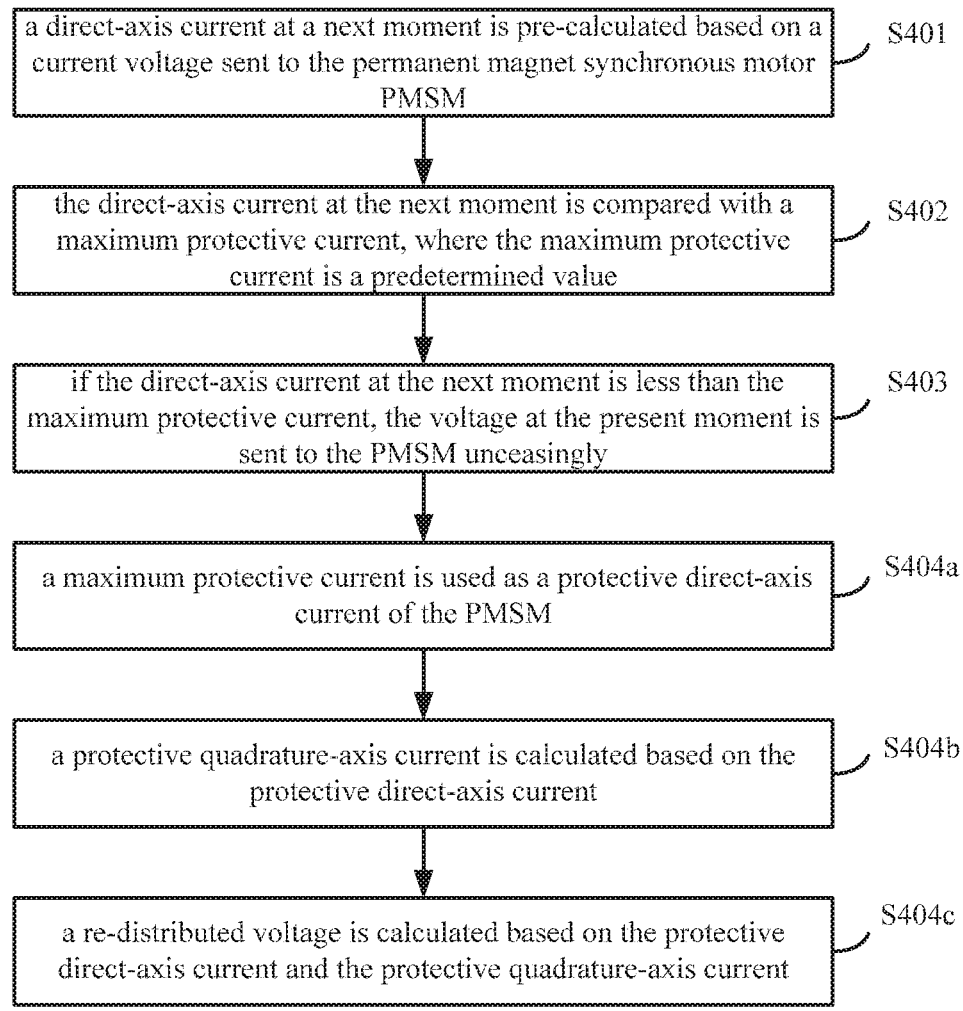
FIG. 4 is a flow chart of a method for protecting a direct-axis current in a permanent magnet synchronous motor drive system according to a second method embodiment of the disclosure.

Referring to FIG. 4, a flow chart of a method for protecting a direct-axis current in a permanent magnet synchronous motor drive system according to a second method embodiment of the disclosure is shown.

It should be noted that, step S401 is the same as step S301.

In step S401, a direct-axis current $i_d(K+1)$ at a next moment is pre-calculated based on a voltage at a present moment sent to the permanent magnet synchronous motor PMSM;

$$i_d(K+1) = \frac{u_d(K)(R_s + L_q s) + (u_q(K) - \omega_e \psi_f)\omega_e L_q}{(R_s + L_q s)(R_s + L_d s) + \omega_e^2 L_d L_q} \quad (10)$$

where $u_d(K)$ and $u_q(K)$ are components of a stator voltage on d axis and q axis respectively; $L_d$, $L_q$ are a direct-axis synchronous inductance and a quadrature-axis synchronous inductance respectively; $\omega_e$ is an electrical angular velocity of the motor and $\omega_e = n_p \omega_r$; $n_p$ is an amount of pole pairs of the motor, $\omega_r$ is a mechanical angular velocity of the motor, $\psi_f$ is magnetic linkage of the permanent magnet, $R_s$ is a stator resistance, and s is a laplacian operator.

Steps S402-S403 are the same as steps S302-S303 respectively, which are not repeated herein.

In step S404, re-distributing a voltage based on a protective direct-axis current and a protective quadrature-axis current includes steps S404a-S404c.

In step S404a, a maximum protective current $i_{d\_protect}$ is used as a protective direct-axis current $i'_d(K+1)$ of the PMSM, i.e., $i'_d(K+1) = i_{d\_protect}$.

In step S404b, a protective quadrature-axis current is calculated based on the protective direct-axis current;

$$i'_q(K+1) = \frac{2T_e(K+1)}{3p(\psi_f + (L_d - L_q)i_{d\_protect})} \quad (11)$$

$$T_e(K+1) = \frac{3}{2}pi_q(K+1)(\psi_f + (L_d - L_q)i_d(K+1)) \quad (12)$$

where, $$i_q(K+1) = \frac{u_q(K)(R_s + L_d s) - (u_d(K)L_d + \psi_f(R_s + L_d s))\omega_e}{(R_s + L_q s)(R_s + L_d s) + \omega_e^2 L_d L_q} \quad (13)$$

In step S404c, a re-distributed voltage is calculated based on the protective direct-axis current and the protective quadrature-axis current.

In other words:

$$u'_d(K) = R_s i'_d(K+1) - \omega_e L_q i'_q(K+1) \quad (14)$$

$$u'_q(K) = R_s i'_q(K+1) + \omega_e(L_d i'_d(K+1) + \psi_f) \quad (15),$$

where $T_e(K+1)$ is torque of the PMSM, $u_d(K)$ and $u_q(K)$ are components of the stator voltage on d axis and q axis respectively; $L_d$ and $L_q$ are the direct-axis synchronous inductance and the quadrature-axis synchronous inductance respectively; $\omega_e$ is the electrical angular velocity of the motor and $\omega_e = n_p \omega_r$; $n_p$ is an amount of pole pairs of the motor, $\omega_r$ is the mechanical angular velocity of the motor; $\psi_f$ is the magnetic linkage of permanent magnet, $R_s$ is the stator resistance, and s is the laplacian operator.

According to this embodiment, obtaining the re-distributed voltage in a case that the direct-axis current at the next moment exceeds the maximum protective current. Although the direct-axis current at the next moment of the PMSM is pre-calculated and protected in the two embodiments mentioned above, the overall system does not have an ability of regulation and recovery. If the direct-axis current at the next moment still exceeds the limit, the PMSM cannot operate in optimum distribution of voltage phase, i.e., a large current is generated under a same torque, which will cause a large heat loss of the overall system and other failures due to the large current. Another embodiment is further provided in the disclosure, according to which the system may be regulated automatically and restored to normal operation. A third method embodiment will be described in detail.

The Third Method Embodiment

Figure 5:
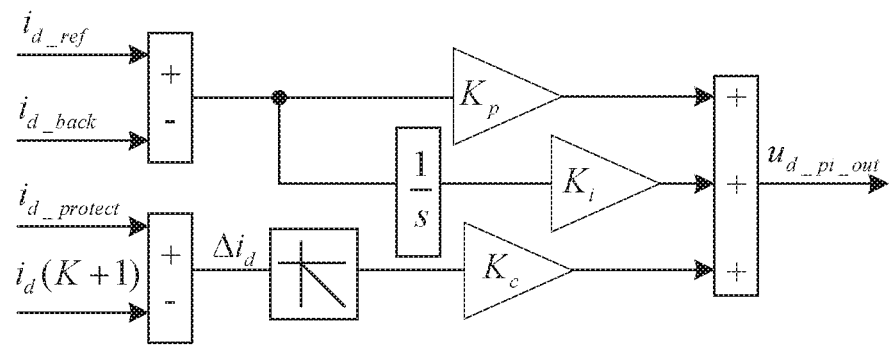
FIG. 5 is a diagram of a PI regulator with anti-integration saturation for the direct-axis current provided in the disclosure.

Referring to FIG. 5, a diagram of a PI regulator with anti-integration saturation for the direct-axis current provided in the disclosure is shown.

According to this embodiment, in a case that a direct-axis current at a next moment is greater than a maximum protective current, the direct-axis current is used as a parameter of anti-integration saturation and introduced into the PI regulator for the direct-axis current, so as to regulate a system automatically and restore the system to a state before protection.

A equation for a conventional PI regulator for the direct-axis current is as follows:

$$u_{d\_pi\_Out} = \left(K_p + K_i \frac{1}{s}\right)(i_{d\_ref} - i_{d\_back}) \quad (16)$$

According to this embodiment, when the direct-axis current is protected, a direct-axis current compensation coefficient $K_c$ is introduced for a part of the direct-axis current out of control, which is used as a parameter of anti-integration saturation into the PI regulator for the direct-axis current, in order to enhance a functionality of the PI regulator, so that the system may be automatically restored to normal operation.

A corrected equation of the PI regulator for the direct-axis current provided in the disclosure is as follows:

$$u_{d\_pi\_Out} = \left(K_p + K_i \frac{1}{s}\right)(i_{d\_ref} - i_{d\_back}) + K_c \Delta i_d \quad (17)$$

where $\Delta i_d = i_{d\_protect} - i_d(K+1)$.

If $i_d(K+1) < i_{d\_protect}$, a value of zero is assigned to $\Delta i_d$, i.e., the PI regulator in conventional technology is not corrected, and PI regulation is performed based on the equation (16). Only if the current at the next moment is greater than the maximum protective current, the PI regulator for the direct-axis current provided in the disclosure works.

$u_{d\_pi\_Out}$ is an output voltage of the PI regulator for the direct-axis current;

$K_i$ is an integral regulation coefficient; $K_p$ is a proportional control factor; $i_{d\_ref}$ is a given value of the direct-axis current; $i_{d\_back}$ is a feedback value of the direct-axis current; and $K_c$ is a compensation coefficient of the direct-axis current.

In the method according to this embodiment, the PI regulator for the direct-axis current is re-designed, an amount by which the direct-axis current at the next moment is greater than the maximum protective current is introduced as an regulable parameter into the PI regulator for the direct-axis current, in order to prevent a current of the system from being out of control. In a case that the PI regulator for the direct-axis current gets saturated, the PI regulator for the direct-axis current may be automatically restored to normal operation after regulation.

Figure 6:
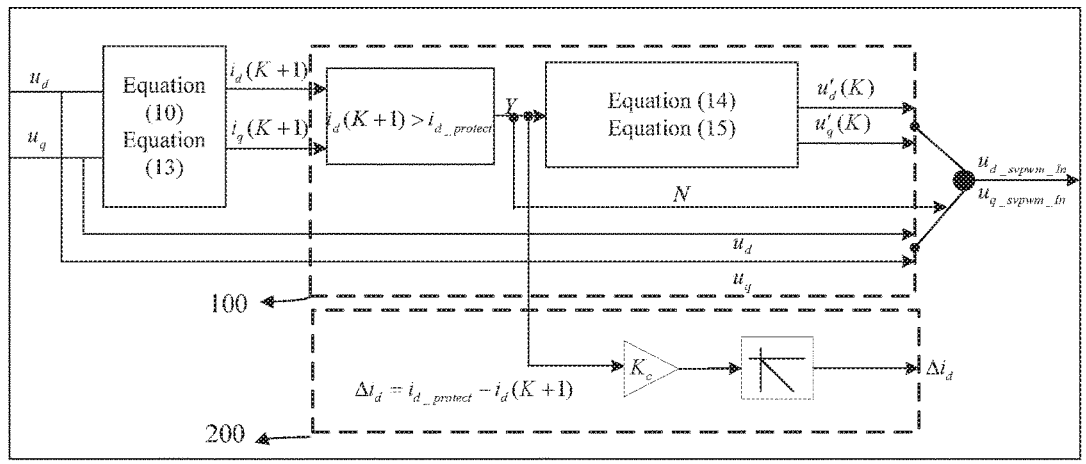
FIG. 6 is a block diagram of a principle of the method for protecting the direct-axis current of PMSM provided in the disclosure.

Referring to FIG. 6, a block diagram of a principle of a method for protecting a direct-axis current provided in the disclosure is shown.

The method for protecting the direct-axis current according to the embodiments of the disclosure may be understood more clearly based on FIG. 6.

Input is a direct-axis voltage and a quadrature-axis voltage outputted from an inverter to the PMSM.

Firstly, a direct-axis current and a quadrature-axis current at a next moment are calculated based on the direct-axis voltage and quadrature-axis voltage through equations (10) and (13).

If the direct-axis current at the next moment is greater than a maximum protective current, a re-distributed voltage is calculated based on equations (14) and (15).

The re-distributed voltage is sent to a part of the inverter for space vector modulation.

It may be seen from FIG. 6 that, a dashed box 100 shows a method for protecting voltage re-distribution, and a dashed box 200 shows a method for protecting a PI regulator for the direct-axis current.

In a case that the direct-axis current at the next moment is greater than the maximum protective current, the PI regulator for the direct-axis current is corrected through $\Delta i_d$.

Based on the method for protecting the direct-axis current in the permanent magnet synchronous motor drive system according to the embodiments mentioned above, a device for protecting a direct-axis current in a permanent magnet synchronous motor drive system is provided according to the embodiments of the disclosure. An operating principle for the device is described in detail in conjunction with embodiments hereinafter.

A First System Embodiment

Figure 7:
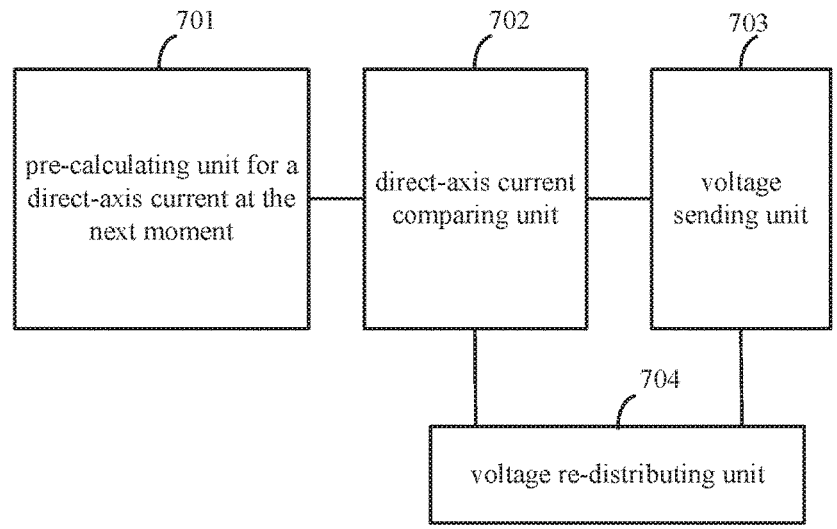
FIG. 7 is a diagram of a device according to a first device embodiment of the disclosure.

Referring to FIG. 7, a diagram of a device according to a first device embodiment of the disclosure is shown.

A device for protecting a direct-axis current in a permanent magnet synchronous motor drive system is provided according to the embodiment of the disclosure. The device includes a pre-calculating unit 701 for a direct-axis current at a next moment, a direct-axis current comparing unit 702, a voltage sending unit 703 and a voltage re-distributing unit 704.

The pre-calculating unit 701 for the direct-axis current at the next moment is configured to pre-calculate a direct-axis current $i_d(K+1)$ at a next moment based on a voltage at a present moment sent to a permanent magnet synchronous motor PMSM, where K represents a present moment, and K+1 represents the next moment.

It should be noted that, the direct-axis current and a quadrature-axis current at a next moment may be calculated based on the direct-axis voltage and the quadrature-axis voltage of the PMSM at the present moment.

The direct-axis voltage and the quadrature-axis voltage are known, and are outputted by an inverter to the PMSM.

Based on a steady state mathematical model of the PMSM, the direct-axis current at the next moment is estimated, a voltage ($u_d(k), u_q(k)$) at a present moment is sent to the PMSM, and the PMSM will generate an actual direct-axis current which is the direct-axis current $i_d(k+1)$ at the next moment relative to a sampling current with closed-loop control.

The direct-axis current comparing unit 702 is configured to compare the direct-axis current at the next moment with a maximum protective current $i_{d\_protect}$, where the maximum protective current $i_{d\_protect}$ has a predetermined value.

The voltage sending unit 703 is configured to send the voltage at the present moment to the PMSM unceasingly when the direct-axis current comparing unit determines that the direct-axis current $i_d(K+1)$ at the next moment is less than the maximum protective current $i_{d\_protect}$.

If the direct-axis current at the next moment is less than the maximum protective current, it concludes that the direct-axis current does not exceed a limit, the voltage ($u_d(k), u_q(k)$) at the present moment may be sent to the PMSM unceasingly.

The voltage re-distributing unit 704 is configured to re-distribute the voltage based on a protective direct-axis current and a protective quadrature-axis current, and send the re-distributed voltage to the PMSM, when the direct-axis current comparing unit determines that the direct-axis current $i_d(K+1)$ at the next moment is greater than or equal to the maximum protective current $i_{d\_protect}$.

If the direct-axis current at the next moment is greater than the maximum protective current, and the voltage ($u_d(k), u_q(k)$) at the present moment is sent to the PMSM unceasingly, a too high direct-axis current will be generated by the PMSM actually, and the permanent magnet faces a risk of magnetism-loss, or even a catastrophic failure of system subversion. Thus, the voltage has to be re-distributed to the PMSM.

In the device for protecting a direct-axis current in a permanent magnet synchronous motor drive system is provided according to the embodiment of the disclosure, the direct-axis current of the PMSM at the next moment may be pre-calculated based on the voltage of the PMSM at the present moment through the steady state mathematical model of the PMSM. If the direct-axis current at the next moment does not exceed the limit, the protection is not performed, and the voltage at the present moment is sent to the PMSM unceasingly, and if the direct-axis current at the next moment exceeds the limit, i.e., the direct-axis current at the next moment is greater than the maximum protective current, the protection is performed, and a recalculated voltage is re-distributed to the PMSM. In this way, the direct-axis current at the next moment normalizes through regulating the voltage, and the re-distributed voltage is sent to the PMSM under a constant operating load of the PMSM. Thus, in the device provided in the disclosure, the direct-axis current at the next moment is pre-calculated, actual operation of the PMSM is simulated, and the protection is performed when the direct-axis current at the next moment exceeds the limit.

A Second System Embodiment

Figure 8:
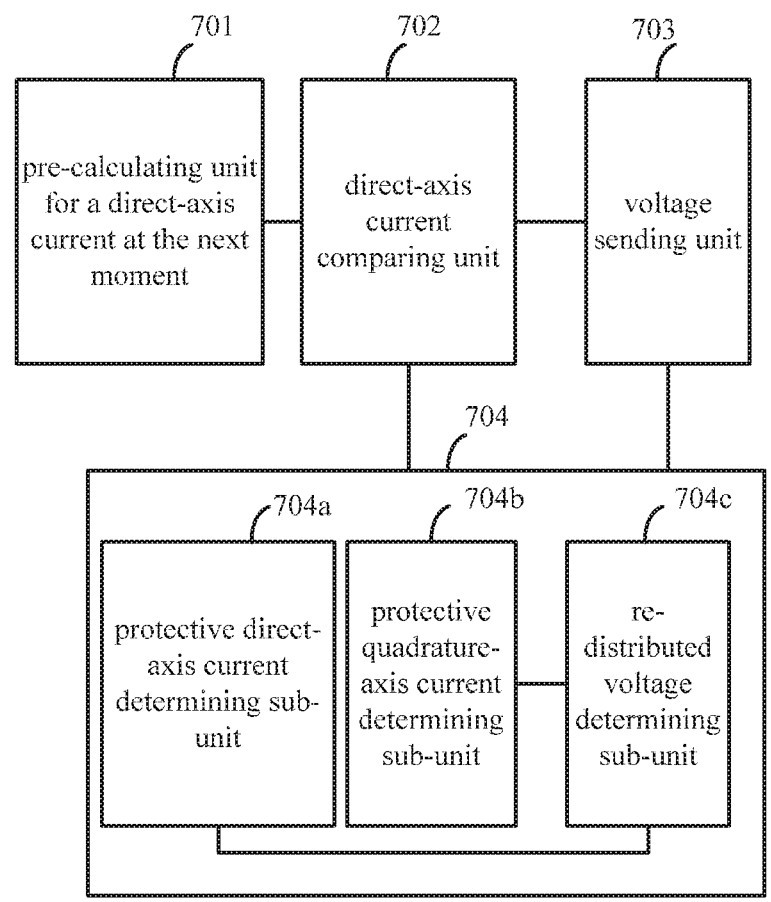
FIG. 8 is a diagram of a device according to a second device embodiment of the disclosure.

Referring to FIG. 8, a diagram of a device according to a second device embodiment of the disclosure is shown.

According to this embodiment, the pre-calculating unit 701 for the direct-axis current at the next moment pre-calculates the direct-axis current $i_d(K+1)$ at the next moment based on the voltage at the present moment sent to the permanent magnet synchronous motor PMSM through the following equation:

$$i_d(K+1) = \frac{u_d(K)(R_s+L_qs) + (u_q(K) - \omega_e\psi_f)\omega_eL_q}{(R_s+L_qs)(R_s+L_ds) + \omega_e^2 L_d L_q}$$

where $u_d(K)$ and $u_q(K)$ are components of a stator voltage on d axis and q axis respectively; $L_d$, $L_q$ are a direct-axis synchronous inductance and a quadrature-axis synchronous inductance respectively; $\omega_e$ is an electrical angular velocity of the motor and $\omega_e = n_p\omega_r$; $n_p$ is an amount of pole pairs of the motor, $\omega_r$ is a mechanical angular velocity of the motor, $\psi_f$ is magnetic linkage of the permanent magnet, $R_s$ is a stator resistance, and s is a laplacian operator.

According to this embodiment, the voltage re-distributing unit 704 includes a protective direct-axis current determining sub-unit 704a, a protective quadrature-axis current determining sub-unit 704b and a re-distributed voltage determining sub-unit 704c.

The protective direct-axis current determining sub-unit 704a is configured to use the maximum protective current $i_{d\_protect}$ as a protective direct-axis current $i'_d(K+1)$ of the PMSM, i.e., $i'_d(K+1) = i_{d\_protect}$.

The protective quadrature-axis current determining sub-unit 704b is configured to calculate the protective quadrature-axis current based on the protective direct-axis current.

$$i'_q(K+1) = \frac{2T_e(K+1)}{3p(\psi_f + (L_d - L_q)i_{d\_protect})} \quad (11)$$

$$T_e(K+1) = \frac{3}{2}pi_q(K+1)(\psi_f + (L_d - L_q)i_d(K+1)) \quad (12)$$

where, $$i_q(K+1) = \frac{u_q(K)(R_s+L_ds) - (u_d(K)L_d + \psi_f(R_s+L_ds))\omega_e}{(R_s+L_qs)(R_s+L_ds) + \omega_e^2 L_d L_q} \quad (13)$$

The re-distributed voltage determining sub-unit 704c is configured to calculate the re-distributed voltage based on the protective direct-axis current and the protective quadrature-axis current.

Specifically, $$u'_d(K) = R_s i'_d(K+1) - \omega_e L_q i'_q(K+1) \quad (14)$$

$$u'_q(K) = R_s i'_q(K+1) + \omega_e(L_d i'_d(K+1) + \psi_f) \quad (15),$$

where $T_e(K+1)$ is torque of the PMSM, $u_d(K)$ and $u_q(K)$ are components of the stator voltage on d axis and q axis respectively; $L_d$ and $L_q$ are the direct-axis synchronous inductance and the quadrature-axis synchronous inductance respectively; $\omega_e$ is the electrical angular velocity of the motor and $\omega_e = n_p\omega_r$; $n_p$ is an amount of pole pairs of the motor, $\omega_r$ is the mechanical angular velocity of the motor; $\psi_f$ is the magnetic linkage of permanent magnet, $R_s$ is the stator resistance, and s is the laplacian operator.

According to this embodiment, obtaining the re-distributed voltage in a case that the direct-axis current at the next moment exceeds the maximum protective current. Although the direct-axis current at the next moment of the PMSM is pre-calculated and protected in the two embodiments mentioned above, the overall system does not have an ability of regulation and recovery. If the direct-axis current at the next moment still exceeds the limit, the PMSM cannot operate in optimum distribution of voltage phase, i.e., a large current is generated under a same torque, which will cause a large heat loss of the overall system and other failures due to the large current. Another device embodiment is further provided in the disclosure, according to which the system may be regulated automatically and restored to normal operation. A third device embodiment will be described in detail.

The Third Device Embodiment

Figure 9:
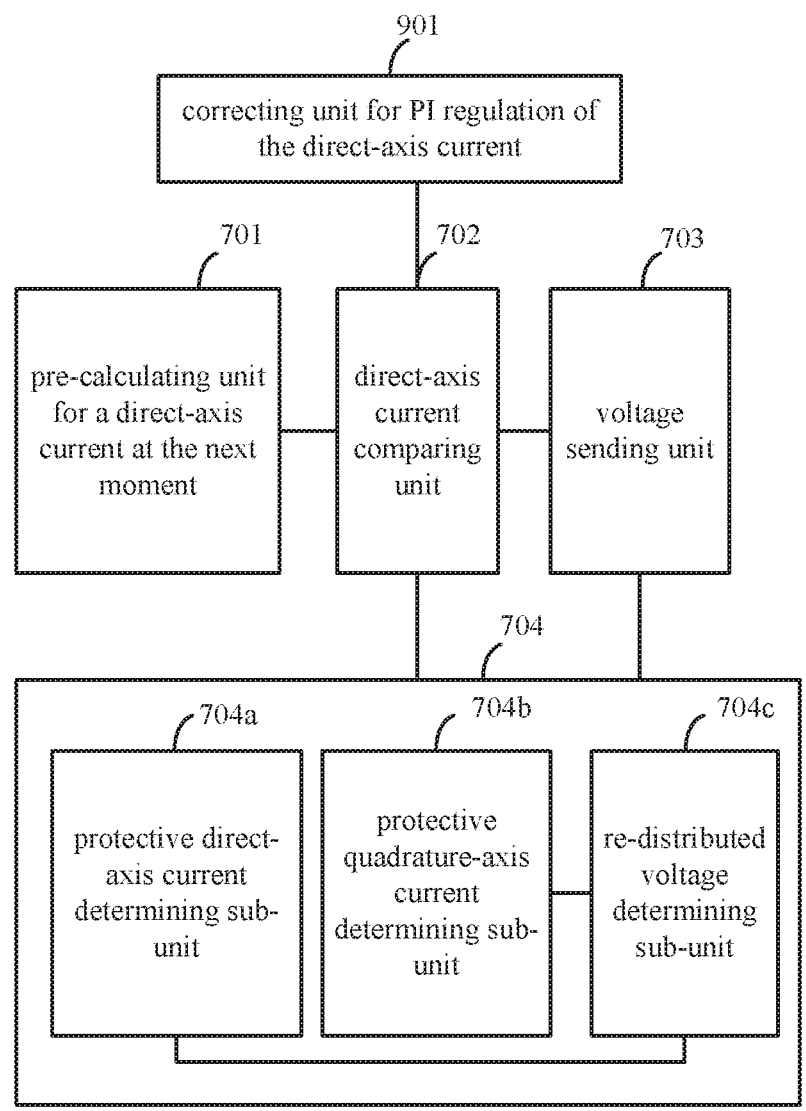
FIG. 9 is a diagram of a device according to a third device embodiment of the disclosure.

Referring to FIG. 9, a diagram of a device according to a third device embodiment of the disclosure is shown.

According to this embodiment, in a case that a direct-axis current at a next moment is greater than a maximum protective current, the direct-axis current is used as a parameter of anti-integration saturation and introduced into the PI regulator for the direct-axis current, so as to regulate a system automatically and restore the system to a state before protection.

A equation for a conventional PI regulator for the direct-axis current is as follows:

$$u_{d\_pi\_Out} = \left(K_p + K_i \frac{1}{s}\right)(i_{d\_ref} - i_{d\_back}) \quad (16)$$

According to this embodiment, when the direct-axis current is protected, a direct-axis current compensation coefficient $K_c$ is introduced for a part of the direct-axis current out of control, which is used as a parameter of anti-integration saturation into a PI regulator for the direct-axis current, in order to enhance a functionality of the PI regulator, so that the system may be automatically restored to normal operation.

The method for protecting a direct-axis current in a permanent magnet synchronous motor drive system provided in the disclosure further includes a correcting unit 901 for PI regulation of the direct-axis current.

The correcting unit 901 for PI regulation of the direct-axis current is configured to introduce the direct-axis current into the PI regulator for the direct-axis current when the direct-axis current comparing unit 702 determines that the direct-axis current $i_d(K+1)$ at the next moment is greater than or equal to the maximum protective current $i_{d\_protect}$, and a equation for a corrected PI regulator for the direct-axis current is as follows:

$$u_{d\_pi\_Out} = \left(K_p + K_i \frac{1}{s}\right)(i_{d\_ref} - i_{d\_back}) + K_c \Delta i_d$$

where $\Delta i_d = i_{d\_protect} - i_d(K+1)$.

If $i_d(K+1) < i_{d\_protect}$, a value of zero is assigned to $\Delta i_d$, i.e., the PI regulator in conventional technology is not corrected, and PI regulation is performed based on the equation (16). Only if the current at the next moment is greater than the maximum protective current, the PI regulator for the direct-axis current provided in the disclosure works.

$u_{d\_pi\_Out}$ is an output voltage of the PI regulator for the direct-axis current;

$K_i$ is an integral regulation coefficient; $K_p$ is a proportional control factor; $i_{d\_ref}$ is a given value of the direct-axis current; $i_{d\_back}$ is a feedback value of the direct-axis current; and $K_c$ is a compensation coefficient of the direct-axis current.

In the method according to this embodiment, the PI regulator for the direct-axis current is re-designed, an amount by which the direct-axis current at the next moment is greater than the maximum protective current is introduced as an regulable parameter into the PI regulator for the direct-axis current, in order to prevent a current of the system from being out of control. In a case that the PI regulator for the direct-axis current gets saturated, the PI regulator for the direct-axis current may be automatically restored to normal operation after regulation.

The embodiments described above are only preferable embodiments of the disclosure and do not limit the disclosure in any form. Though the disclosure is described through the preferable embodiments, it is not limited by those embodiments. Lots of possible changes, modifications, and equivalent replacement for equivalent embodiments may be made to the technical solutions of the disclosure by those skilled in the art based on the method and technical content described herein without departing from the scope of the technical solutions of the disclosure. Therefore, any changes, equivalent replacement, and modifications made to the embodiments based on the technical essential of the disclosure without departing from the content of the technical solutions of the disclosure should fall within the protection scope of the technical solutions of the disclosure.

The invention claimed is:

1. A method for protecting a direct-axis current in a permanent magnet synchronous motor drive system, comprising:

pre-calculating a direct-axis current $i_d(K+1)$ at a next moment based on a voltage at a present moment sent to a permanent magnet synchronous motor PMSM from an inverter, wherein K represents the present moment, and K+1 represents the next moment;

comparing the direct-axis current at the next moment with a maximum protective current $i_{d\_protect}$, wherein the maximum protective current $i_{d\_protect}$ is a predetermined value, and is a upper limit of the direct-axis current at the next moment beyond which a system overcurrent failure or a magnetism-loss of the permanent magnet is caused;

sending the voltage at the present moment to the PMSM unceasingly, if the direct-axis current $i_d(K+1)$ at the next moment is less than the maximum protective current $i_{d\_protect}$;

re-distributing a voltage based on a protective direct-axis current and a protective quadrature-axis current, and sending the re-distributed voltage to the PMSM, if the direct-axis current $i_d(K+1)$ at the next moment is greater than or equal to the maximum protective current $i_{d\_protect}$;

wherein if the direct-axis current $i_d(K+1)$ at the next moment is greater than or equal to the maximum protective current $i_{d\_protect}$, the method further comprises: introducing the direct-axis current into a PI regulator for the direct-axis current, $$u_{d\_pi\_Out} = \left(K_p + K_i \frac{1}{s}\right)(i_{d\_ref} - i_{d\_back}) + K_c \Delta i_d$$

$$\Delta i_d = i_{d\_protect} - i_d(K+1);$$

wherein $u_{d\_pi\_Out}$ is an output voltage of the PI regulator for the direct-axis current; and $K_i$ is an integral regulation coefficient; $K_p$ is a proportional control factor; $i_{d\_ref}$ is a given value of the direct-axis current; $i_{d\_back}$ is a feedback value of the direct-axis current and $K_c$ is a compensation coefficient of the direct-axis current.

2. The method for protecting the direct-axis current in the permanent magnet synchronous motor drive system according to claim 1, wherein the direct-axis current $i_d(K+1)$ at the next moment is pre-calculated based on the voltage at the present moment sent to the permanent magnet synchronous motor PMSM, $$i_d(K+1) = \frac{u_d(K)(R_s + L_q s) + (u_q(K) - \omega_e \psi_f)\omega_e L_q}{(R_s + L_q s)(R_s + L_d s) + \omega_e^2 L_d L_q},$$

wherein $u_d(K)$ and $u_q(K)$ are components of a stator voltage on d axis and q axis respectively; $L_d$, $L_q$ are a direct-axis synchronous inductance and a quadrature-axis synchronous inductance respectively; $\omega_e$ is an electrical angular velocity of a motor and $\omega_e = n_p \omega_r$; $n_p$ is an amount of pole pairs of the motor, $\omega_r$ is a mechanical angular velocity of the motor; $\psi_f$ is magnetic linkage of a permanent magnet, $R_s$ a stator resistance, and s is a laplacian operator.

3. The method for protecting the direct-axis current in the permanent magnet synchronous motor drive system according to claim 1, wherein re-distributing the voltage based on the protective direct-axis current and the protective quadrature-axis current comprises:

using the maximum protective current $i_{d\_protect}$ as a protective direct-axis current $i'_d(K+1)$ of the PMSM;
calculating the protective quadrature-axis current based on the protective direct-axis current; and
calculating the re-distributed voltage based on the protective direct-axis current and the protective quadrature-axis current.

4. The method for protecting the direct-axis current in the permanent magnet synchronous motor drive system according to claim 3, wherein calculating the protective quadrature-axis current $i'_q(K+1)$ based on the protective direct-axis current comprises:

$$i'_q(K+1) = \frac{2T_e(K+1)}{3p(\psi_f + (L_d - L_q)i_{d\_protect})},$$

wherein $T_e(K+1) = \frac{3}{2}pi_q(K+1)(\psi_f + (L_d - L_q)i_d(K+1))$, and $$i_q(K+1) = \frac{u_q(K)(R_s + L_d s) - (u_d(K)L_d + \psi_f(R_s + L_d s))\omega_e}{(R_s + L_q s)(R_s + L_d s) + \omega_e^2 L_d L_q};$$

and wherein calculating the re-distributed voltage based on the protective direct-axis current and the protective quadrature-axis current comprises:

$u'_d(K) = R_s i'_d(K+1) - \omega_e L_q i'_q(K+1)$, and $u'_q(K) = R_s i'_q(K+1) + \omega_e(L_d i'_d(K+1) + \psi_f)$, wherein the re-distributed voltage comprises a re-distributed direct-axis voltage $u'_d(K)$ and a re-distributed quadrature-axis voltage $u'_q(K)$, $T_e(K+1)$ is torque of the PMSM, $u_d(K)$ and $u_q(K)$ are components of a stator voltage on d axis and q axis respectively; $L_d$ and $L_q$ are a direct-axis synchronous inductance and a quadrature-axis synchronous inductance respectively; $\omega_e$ is an electrical angular velocity of a motor and $\omega e = n_p \omega_r$; $n_p$ is an amount of pole pairs of the motor, $\omega_r$ is a mechanical angular velocity of the motor; $\psi_f$ is magnetic linkage of a permanent magnet, $R_s$ is a stator resistance, and s is a laplacian operator.

5. The method for protecting the direct-axis current in the permanent magnet synchronous motor drive system according to claim 2, wherein if the direct-axis current $i_d(K+1)$ at the next moment is greater than or equal to the maximum protective current $i_{d\_protect}$, the method further comprises: introducing the direct-axis current into a PI regulator for the direct-axis current, $$u_{d\_pi\_Out} = \left(K_p + K_i \frac{1}{s}\right)(i_{d\_ref} - i_{d\_back}) + K_c \Delta i_d$$

$$\Delta i_d = i_{d\_protect} - i_d(K+1);$$

wherein $u_{d\_pi\_Out}$ is an output voltage of the PI regulator for the direct-axis current; and
$K_i$ is an integral regulation coefficient; $K_p$ is a proportional control factor; $i_{d\_ref}$ is a given value of the direct-axis current; $i_{d\_back}$ is a feedback value of the direct-axis current; and $K_c$ is a compensation coefficient of the direct-axis current.

6. A device for protecting a direct-axis current in a permanent magnet synchronous motor drive system, comprising a pre-calculating unit for a direct-axis current at a next moment, a direct-axis current comparing unit, a voltage sending unit, a voltage re-distributing unit and a correcting unit for PI regulation of the direct-axis current;

the pre-calculating unit for the direct-axis current at the next moment is configured to pre-calculate a direct-axis current $i_d(K+1)$ at a next moment based on a voltage at a present moment sent to a permanent magnet synchronous motor PMSM, wherein K represents the present moment, and K+1 represents the next moment;
the direct-axis current comparing unit is configured to compare the direct-axis current at the next moment with a maximum protective current $i_{d\_protect}$, wherein the maximum protective current $i_{d\_protect}$ is a predetermined value, and a system overcurrent failure or a magnetism-loss of the permanent magnet is caused in a case that the direct-axis current at the next moment is greater than a maximum protective current;
the voltage sending unit is configured to send the voltage at the present moment to the PMSM unceasingly when the direct-axis current comparing unit determines that the direct-axis current $i_d(K+1)$ at the next moment is less than the maximum protective current $i_{d\_protect}$;
the voltage re-distributing unit is configured to re-distribute a voltage based on a protective direct-axis current and a protective quadrature-axis current, and send a re-distributed voltage to the PMSM, when the direct-axis current comparing unit determines that the direct-axis current $i_d(K+1)$ at the next moment is greater than or equal to the maximum protective current $i_{d\_protect}$; and
the correcting unit for PI regulation of the direct-axis current is configured to introduce the direct-axis current into a PI regulator for the direct-axis current when the direct-axis current comparing unit determines that the direct-axis current $i_d(K+1)$ at the next moment is greater than or equal to the maximum protective current $i_{d\_protect}$, and an equation for a corrected PI regulator for the direct-axis current is as follows:

$$u_{d\_pi\_Out} = \left(K_p + K_i \frac{1}{s}\right)(i_{d\_ref} - i_{d\_back}) + K_c \Delta i_d,$$

$$\Delta i_d = i_{d\_protect} - i_d(K+1);$$

wherein $u_{d\_pi\_Out}$ is an output voltage of the PI regulator for the direct-axis current; and $K_i$ is an integral regulation coefficient; $K_p$ is a proportional control factor; $i_{d\_ref}$ is a given value of the direct-axis current; $i_{d\_back}$ is a feedback value of the direct-axis current and $K_c$ is a compensation coefficient of the direct-axis current.

7. The device for protecting the direct-axis current in the permanent magnet synchronous motor drive system according to claim 6, wherein pre-calculating, by the pre-calculating unit for the direct-axis current at the next moment, the direct-axis current $i_d(K+1)$ at the next moment based on the voltage at the present moment sent to the permanent magnet synchronous motor PMSM, is implemented through the following equation:

$$i_d(K+1) = \frac{u_d(K)(R_s + L_q s) + (u_q(K) - \omega_e \psi_f)\omega_e L_q}{(R_s + L_q s)(R_s + L_d s) + \omega_e^2 L_d L_q},$$

wherein $u_d(K)$ and $u_q(K)$ are components of a stator voltage on d axis and q axis respectively; $L_d$, $L_q$ are a direct-axis synchronous inductance and a quadrature-axis synchronous inductance respectively; $\omega_e$ is an electrical angular velocity of a motor and $\omega_e=n_p\omega_r$; $n_p$ is an amount of pole pairs of the motor, $\omega_r$ is a mechanical angular velocity of the motor, $\psi_f$ is magnetic linkage of a permanent magnet, $R_s$ is a stator resistance, and s is a laplacian operator.

8. The device for protecting the direct-axis current in the permanent magnet synchronous motor drive system according to claim 6, wherein the voltage re-distributing unit comprises a protective direct-axis current determining sub-unit, a protective quadrature-axis current determining sub-unit and a re-distributed voltage determining sub-unit;

the protective direct-axis current determining sub-unit is configured to use the maximum protective current $i_{d\_protect}$ as a protective direct-axis current $i'_d(K+1)$ of the PMSM;

the protective quadrature-axis current determining sub-unit is configured to calculate the protective quadrature-axis current based on the protective direct-axis current; and the re-distributed voltage determining sub-unit is configured to calculate the re-distributed voltage based on the protective direct-axis current and the protective quadrature-axis current.

9. The device for protecting the direct-axis current in the permanent magnet synchronous motor drive system according to claim 8, wherein the protective quadrature-axis current determining sub-unit calculates the protective quadrature-axis current based on the protective direct-axis current through the following equation:

$$i'_q(K+1) = \frac{2T_e(K+1)}{3p(\psi_f + (L_d - L_q)i_{d\_protect})},$$

wherein $T_e(K+1) = \frac{3}{2}pi_q(K+1)(\psi_f + (L_d - L_q)i_d(K+1))$ and $$i_q(K+1) = \frac{u_q(K)(R_s + L_d s) - (u_d(K)L_d + \psi_f(R_s + L_d s))\omega_e}{(R_s + L_q s)(R_s + L_d s) + \omega_e^2 L_d L_q};$$

and wherein calculating, by the re-distributed voltage determining sub-unit, the re-distributed voltage through the following equation, comprises:

$u'_d(K)=R_s i'_d(K+1)-\omega_e L_q i'_q(K+1)$, and $u'_q(K)=R_s i'_q(K+1)+\omega_e(L_d i'_d(K+1)+\psi_f)$, wherein the re-distributed voltage comprises a re-distributed direct-axis voltage $u'_d(K)$ and a re-distributed quadrature-axis voltage $u'_q(K)$, $T_e(K+1)$ is torque of the PMSM, $u_d(K)$ and $u_q(K)$ are components of a stator voltage on d axis and q axis respectively; $L_d$ and $L_q$ are a direct-axis synchronous inductance and a quadrature-axis synchronous inductance respectively; $\omega_e$ is an electrical angular velocity of a motor and $\omega_e=n_p\omega_r$; $n_p$ is an amount of pole pairs of the motor, $\omega_r$ is a mechanical angular velocity of the motor, $\psi_f$ is magnetic linkage of a permanent magnet, $R_s$ is a stator resistance, and s is a laplacian operator.

10. The device for protecting the direct-axis current in the permanent magnet synchronous motor drive system according to claim 7, further comprising a correcting unit for PI regulation of the direct-axis current;

wherein the correcting unit for PI regulation of the direct-axis current is configured to introduce the direct-axis current into a PI regulator for the direct-axis current when the direct-axis current comparing unit determines that the direct-axis current $i_d(K+1)$ at the next moment is greater than or equal to the maximum protective current $i_{d\_protect}$, and a equation for a corrected PI regulator for the direct-axis current is as follows:

$$u_{d\_pi\_Out} = \left(K_p + K_i \frac{1}{s}\right)(i_{d\_ref} - i_{d\_back}) + K_c \Delta i_d,$$

wherein $u_{d\_pi\_Out}$ is an output voltage of the PI regulator for the direct-axis current; and $K_i$ is an integral regulation coefficient; $K_p$ is a proportional control factor; $i_{d\_ref}$ is a given value of the direct-axis current; $i_{d\_back}$ is a feedback value of the direct-axis current; and $K_c$ is a compensation coefficient of the direct-axis current.

\* \* \* \* \*